July 19, 1960 P. ROUX 2,945,528
MACHINES FOR SHAPING SHEET METAL
Filed April 19, 1957 3 Sheets-Sheet 1

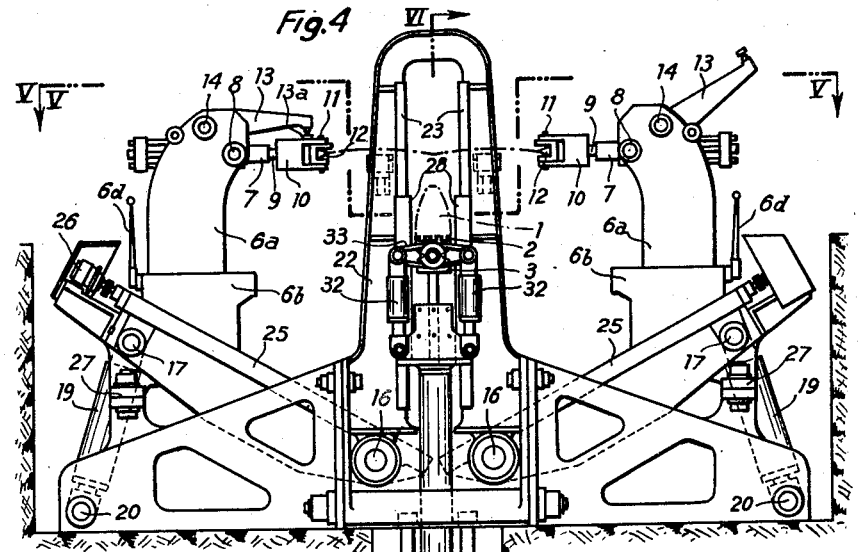
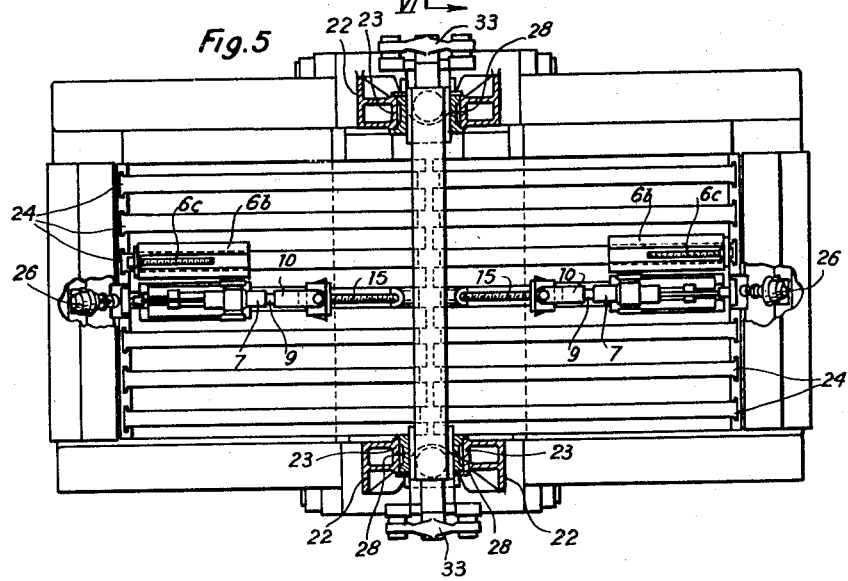

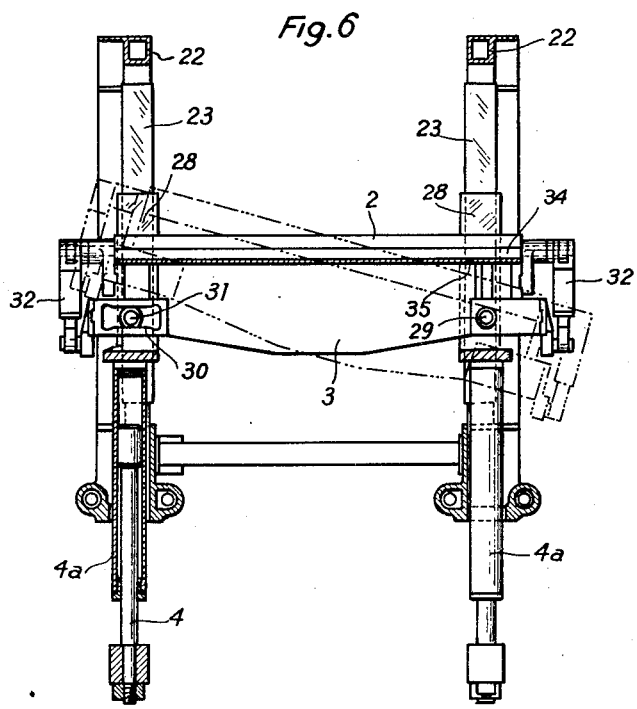

United States Patent Office 2,945,528
Patented July 19, 1960

2,945,528

MACHINES FOR SHAPING SHEET METAL

Pierre Roux, Paris, France, assignor to Etablissements L. Morane Societe Anonyme, Paris, France Filed Apr. 19, 1957, Ser. No. 654,022

Claims priority, application France Apr. 30, 1956

1 Claim. (Cl. 153—32)

There already exists a large number of machines for shaping sheet metal along its surface by means of a shaping or forming member which, subjected to a sufficient thrust, is applied against a sheet of metal which is gripped between two jaws.

In a first type of these machines, the forming member is arranged flat, and two jaws grip two of the opposite edges of the metal sheet. The forming member moves vertically and the jaws move horizontally.

In another type of machine, the forming member is fixed and it is the jaws which move in such manner as to apply the metal sheet over the entire useful contour of the forming member. The jaws are carried for example by an articulated system, and they move in the plane of the metal sheet.

The first type of machine has the disadvantage that it curves the edges of the sheet.

The second type of machine has the drawback of being extremely bulky, and also it does not enable relatively closed profiles to be obtained, since it is not possible to bring the jaws closer together than a certain minimum distance.

The present invention has for its object to reduce these drawbacks as far as possible. It has for its object a machine for bending and shaping metal sheets, comprising a forming member movable in a vertical plane, and two groups of jaws or gripping members arranged on each side of this vertical plane so as to hold the sheet and to force it to bend, the said jaws being articulated on the support so as to be able to follow the direction of the tension of the metal sheet, the supports of the jaws being movable in planes sloping downwards towards the vertical plane in which the movement of the forming member is effected.

It should be observed that the machine possesses a large number of parameters for carrying out relative movement of the forming member and the jaws. For this reason, it is possible to carry out different bending movements of the metal sheet by suitable adjustment of the machine. The overall size of the machine is furthermore quite acceptable.

The description which follows below with reference to the accompanying drawings (which are given by way of example only and not in any sense by way of limitation) will make it quite clear how the invention may be carried into effect, the special features which are brought out, either in the drawings or in the text, being understood to form a part of the said invention.

Fig. 4 is a view similar to that shown in Fig. 1 of one form of embodiment of the machine.

Fig. 5 is a cross-section along the line V—V of Fig. 4, in which cross-section there has been shown only two complete symmetrical carriages, including the members carried by these carriages.

Fig. 6 is a cross-section taken along the line VI—VI of Fig. 4.

Figure 1:
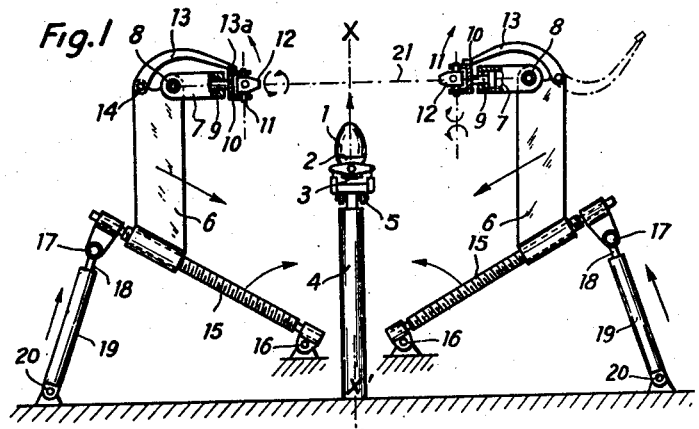
Fig. 1 is a schematic view in elevation of the machine, showing clearly the geometric forms of its various members.

The bending of the metal sheet is intended to be effected by supporting and bending it on a forming member 1, of which only the profile is shown in Fig. 1, and which extends at right angles to the plane of the drawing. This forming member is arranged on a table 2 which can turn on a supporting girder 3, movable vertically in a plane X—X'. This girder is carried by its extremities on vertical jack rods 4, the movements of which are independent. Pivots are provided at 5 in order to permit of unequal vertical travel of the jacks, and in consequence, a more or less pronounced and adjustable slope of the girder 3 in the vertical plane X—X'. In each side of this plane X—X' are mounted a number of units for gripping and handling the metal sheet, of which only two have been shown for the sake of simplicity. Each unit comprises a carriage 6 on the upper part of which is mounted a jack 7, pivotally attached to the carriage by a horizontal spindle 8. The rod 9 of the jack can rotate in the jack, and carries at its extremity a cage 10 in the form of a stirrup, in which is pivotally mounted, on a spindle 11 perpendicular to the rod 9, a pair of gripping jaws 12, the jacks 7 applying a tensile force to the metal sheet 21 which is gripped between the jaws. The carriage 6 is provided at its upper portion with a lever 13, pivotally mounted on a horizontal spindle 14, on which it can be locked in position. The extremity of the lever 13 then forms a supporting abutment 13a, which prevents the movements of the jaws about the spindles 8 and 9 (left-hand part of Fig. 1). The carriage 6 is movable by displacement along the length of a rod 15 sloping downwards towards the plane X—X'. This rod is provided at its extremities with two pivotal mountings, of which that in the vicinity of the plane X—X', or the rear extremity 16, is fixed. The other pivot 17 is arranged at the extremity of the rod 18 of a jack 19 which is supported obliquely on the foundation by means of a pivoted joint 20. The displacement of the carriage 6 along the rod 15 is obtained by rotation of the rod about its own axis, the rod being threaded to correspond with a threaded portion of the carriage.

The schematic description which has just been given shows that it is possible to move the forming member in a vertical plane, to give it an inclination in this plane and also with respect to this plane. The mounting of the jaws enables them to take up any appropriate direction, when the lever 13 is not locked, and it is also possible to move the carriage 6 over a desired distance and along any desired slope.

Figure 2:
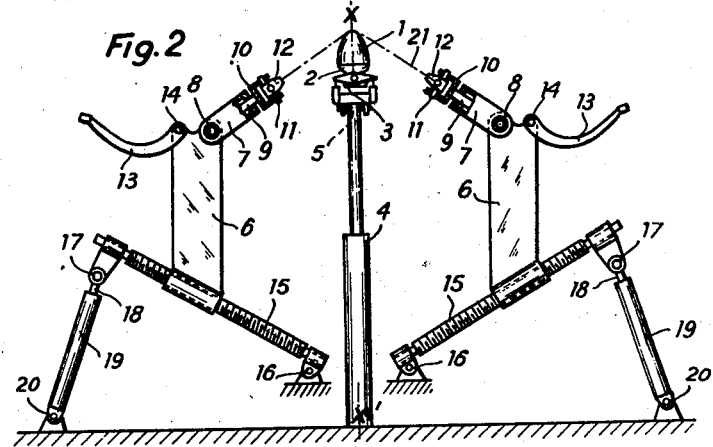
Fig. 2 is similar to Fig. 1, and shows the most general form of operation of the machine.

Fig. 2 shows the most general form of operation of the sheet-bending and shaping machine, shown in Fig. 1. The metal sheet, indicated by the dotted lines 21 and originally flat (see Fig. 1), is subjected to a deformation produced by the forming member 1 carrying out an upward movement, which movement is combined with the downward movements of the carriages 6 along the rods 15. It can be seen that by virtue of the three pivotal axes of the jaws, the line of action of the jaws is located automatically in the plane of the metal sheet, so that there is no bending of the edges of the sheet. In addition, the inclination of the rods 15 reduces the vertical travel of the forming member 1 required to obtain a given degree of deformation.

Figure 3:
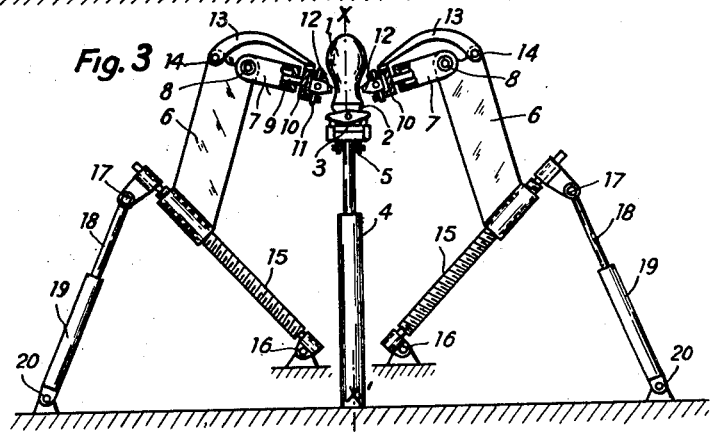
Fig. 3 is similar to Figs. 1 and 2, and shows a particular form of operation of the machine.

Fig. 3 shows a form of operation in which the bending of the metal sheet is effected by bringing the jaws and the forming member close together, by means of a rising movement of the jack rods 18. The levers 13 are then locked in position. This arrangement makes it possible to shape the metal sheet to forms having concave portions such as that shown in Fig. 3, and more precisely, forms which close towards the bottom, which result cannot be obtained with the arrangement of Fig. 2 in which the movements are limited by the width of the table 2.

Figs. 4, 5 and 6 show one form of construction of the machine. The parts already shown in Figs. 1, 2 and 3 are given the same reference numbers. These members are supported by a frame 22 comprising two vertical guides 23 which control the movement of the forming member. The carriages 6 slide in slots 24 (one carriage per slot) formed in tables 25 which are pivotally mounted at their lower parts about longitudinal shafts 16. The threaded rods 15 which operate the carriages are arranged in the slots 24 and are driven by separate electric motors 26. In Fig. 5, the carriages corresponding to the various slots have not been shown; only two complete carriages have been drawn-in. In the position of least possible inclination, each table 25 rests on the frame at 27 through the medium of supporting abutments. Each carriage 6 is formed in two parts, an upper part 6a carrying the jack and a lower part 6b (see Fig. 5) sliding on the table, these two parts being capable of being slightly displaced one with respect to the other by means of a threaded rod 6c moved by a lever 6d so as to provide a control adjustment of the position of the starting plane of the tensioning jaws.

As is particularly shown in Fig. 6, it is the cylinders 4a of the jacks 4 which are movable with respect to their pistons and which carry slides 28 at their upper extremities, sliding in vertical guides 23 of the frame. The girder 3 is pivotally coupled to one of these slides by a pivot 29 about which it can rotate, and to the other slide by an elongated slot 30 cooperating with a pivot 31 coupled to this slide, so as to permit the inclination of the girder with respect to the horizontal. This inclined position is shown in chain-dotted lines in Fig. 6. At each of its extremities, the girder carries two screw-jacks 32 mounted on each side of the girder. These jacks are pivotally connected at their lower part to the girder and at their upper part to the extremities of a rocking-lever 33 coupled to the table which carries the forming member. This tables rests by a semi-cylindrical bearing surface 34 on a corresponding cylindrical bearing 35 formed in the upper part of the girder. By varying the relative lengths of the two jacks 32, the former-carrying table 2 is given an inclination, and in consequence the forming member is inclined with respect to its vertical plane of movement.

It will of course be understood that modifications may be made to the forms of embodiment which have just been described, in particular by the substitution of equivalent technical means, without thereby departing from the spirit or from the scope of the present invention.

What I claim is:

A machine for shaping metal sheets comprising, in combination, a movable forming member; means for displacing said forming member in a substantially vertical plane; two sets of gripping members respectively arranged on opposite sides of said vertical plane and adapted to hold a metal sheet while resisting the forces resulting from the displacement of said forming member; a movable support for each of said gripping members; connecting means for connecting each of said gripping members to its support for turning movement about three axes substantially normal to each other so that said gripping members may follow the direction of tension of the metal sheet; guide means for guiding the movements of said supports, said guide means forming respectively inclined guides sloping downwardly towards said vertical plane and being pivotally mounted at their lower ends thereof adjacent said vertical plane for turning movement about horizontal axes; means for varying the inclination of each of said guides independently of the other said guides; first moving means for moving each of said supports independently along said guide means thereof, and independent of said means for displacing said forming member, toward and away from said vertical plane; and second moving means operatively connected to said gripping members and said supports, respectively, for independently moving said gripping members toward and away from said supports.

References Cited in the file of this patent

UNITED STATES PATENTS

| | | |
|---|---|---|
| 2,041,365 | Mitchell et al. | May 19, 1936 |
| 2,442,268 | Fields et al. | May 25, 1948 |
| 2,459,132 | Nielson | Jan. 11, 1949 |
| 2,753,915 | Raynes | July 10, 1956 |
| 2,759,513 | Green | Aug. 21, 1956 |